June 17, 1930. W. FERGUSON 1,764,292
FURNACE
Filed Oct. 19, 1927 3 Sheets-Sheet 1
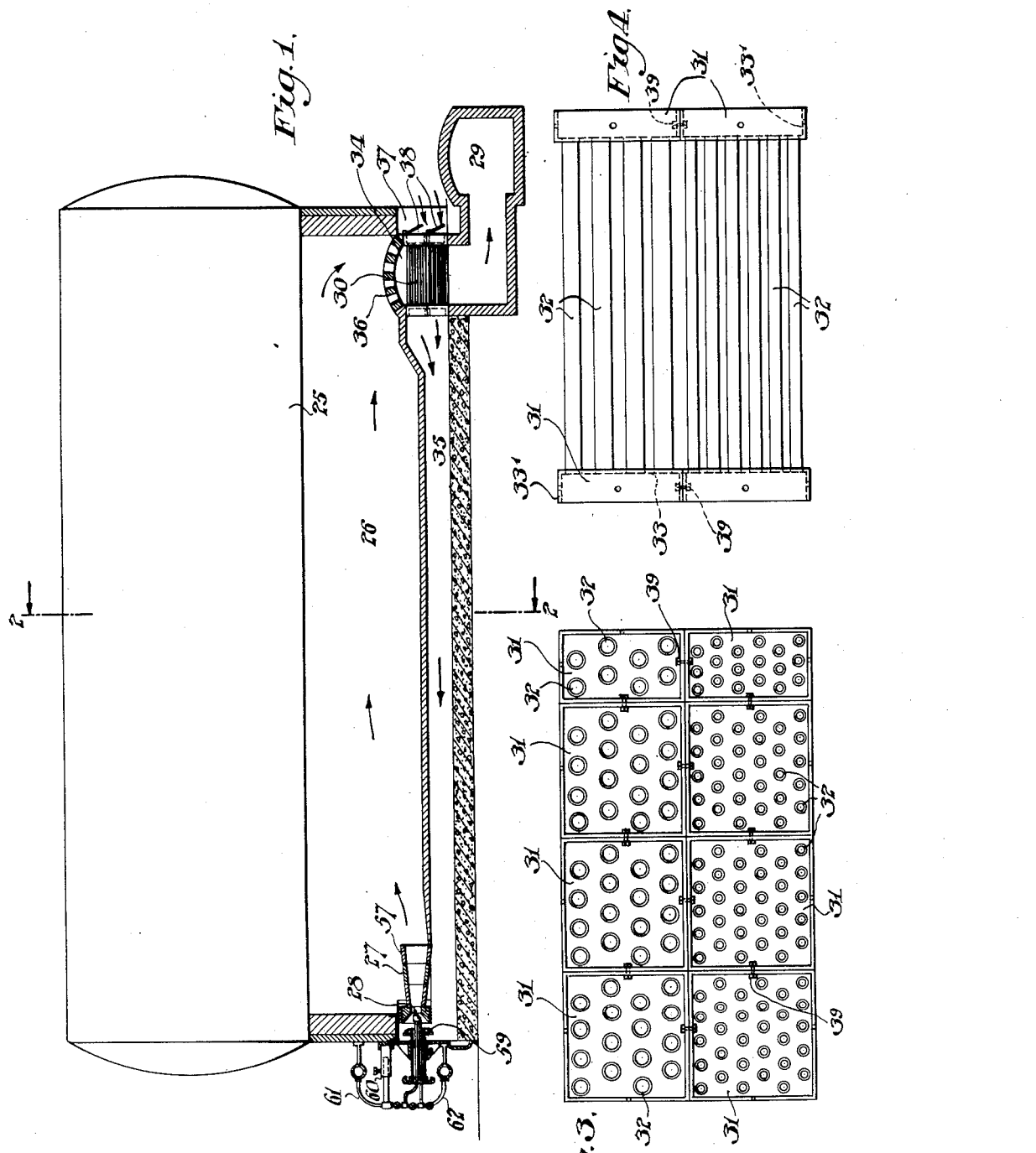
Inventor:
William Ferguson,
By McEwardale
Attorney.

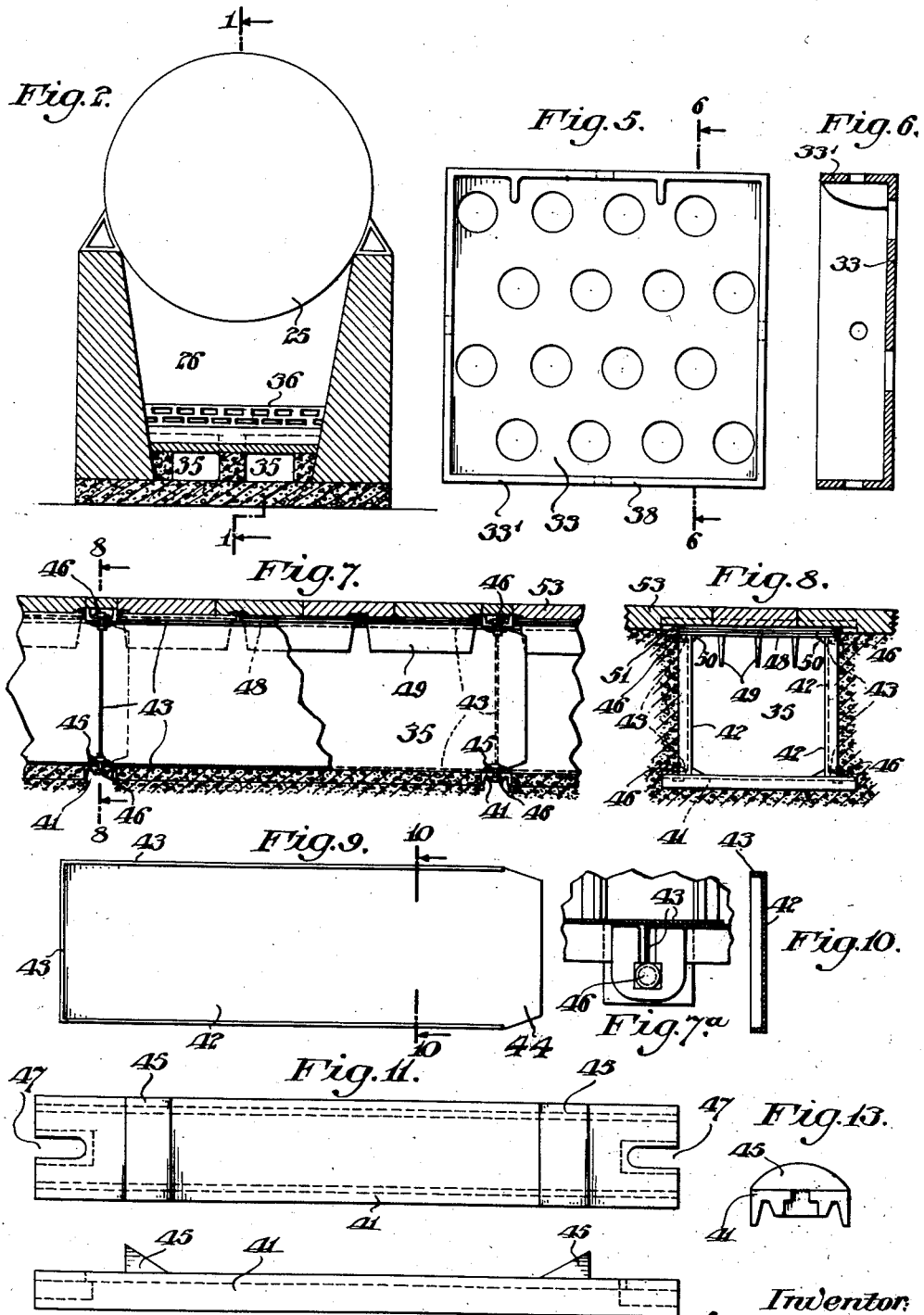

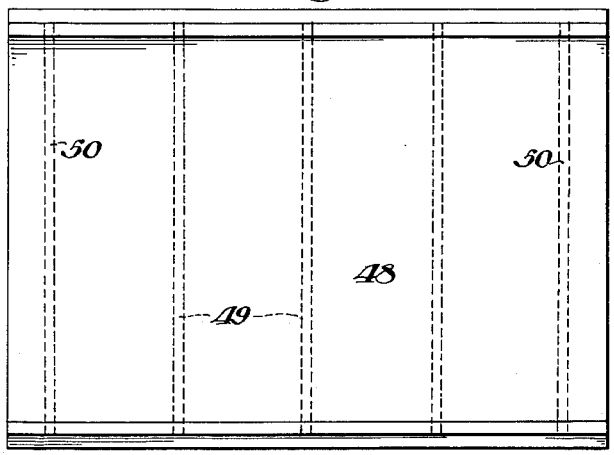
Fig. 14.
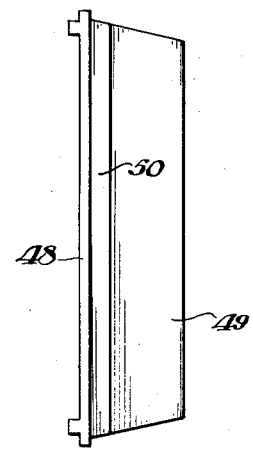
Fig. 16.
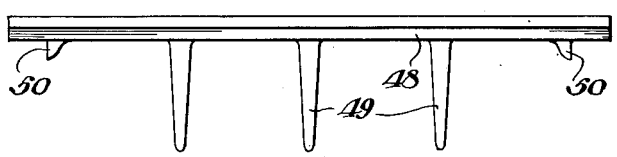
Fig. 15.
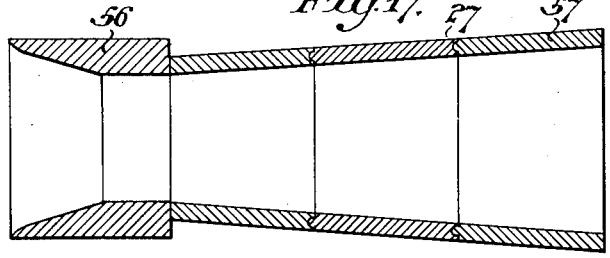
Fig. 17.
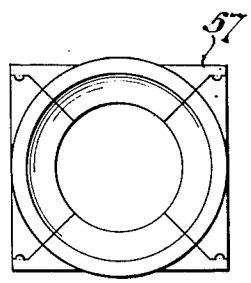
Fig. 18.
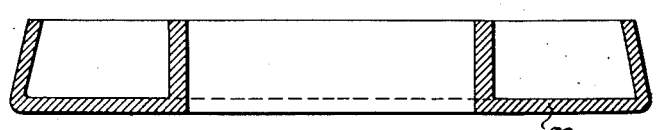
Fig. 20.
Fig. 19.
Inventor.
William Ferguson,
By ____
Attorney.

Patented June 17, 1930

1,764,292

UNITED STATES PATENT OFFICE

WILLIAM FERGUSON, OF PHILADELPHIA, PENNSYLVANIA, ASSIGNOR TO NATIONAL AIROIL BURNER COMPANY, INCORPORATED, A CORPORATION OF DELAWARE

FURNACE

Application filed October 19, 1927. Serial No. 227,105.

The invention relates to furnaces. The object is to provide improved method and means for facilitating the combustion of fuel therein.

The invention comprises improved method and means for heating the air and for delivering heated air with the fuel into the combustion chamber.

The invention comprises improved method and means for utilizing the heat of the products of combustion as the same pass to the stack, to heat fresh air to be delivered with the fuel to the combustion chamber by the inductive action of the fuel.

The invention comprises a closed heater through which the air is drawn and about which the burnt products pass.

The invention comprises method and means whereby the said heater may be formed of sections which units may be increased or diminished to meet the requirements of the furnace.

The invention comprises method and means whereby the different units may have tubes provided as to diameter and the space between them to meet conditions resulting from the cooling and contracting of the burnt products as they pass from the combustion chamber.

The invention comprises improvements in the construction and arrangement of the hot air ducts, leading from the heater to the burners, whereby the air receives additional heat from the combustion chamber, and the floor of said chamber is kept relatively cool.

The invention comprises improvements in method and means whereby the introduction of fuel or combustible mixture into the combustion chamber causes the entrainment of the required amount of air to facilitate efficient combustion.

The invention comprises improvements in the arrangement and construction of the Venturi elements associated with the burners.

The invention comprises other details in construction and arrangement.

The invention comprises improved means for preheating the air for combustion, by recovering and re-using heat that would otherwise be wasted, and thereby accelerating combustion, with materially less excess air and with a resulting high initial temperature of combustion and consequently a greater transfer of heat from the direct radiation of the flame. This increase in radiated heat is in itself conducive to a lower stack temperature because of the more effective heat transfer rate in the furnace, and the smaller volume due to less excess air.

Referring to the drawings, which illustrate merely by way of example a suitable embodiment of my invention;

Fig. 1 is a longitudinal section on line 1, 1 of Fig. 2.

Fig. 2 is a cross-section on line 2, 2 of Fig. 1.

Fig. 3 is a front elevation of an assembly of heater units.

Fig. 4 is a side elevation of same.

Fig. 5 is a front elevation of a tube plate.

Fig. 6 is a side elevation of same.

Fig. 7 is a fragmentary longitudinal vertical section of the air duct.

Fig. 7ª is a fragmentary horizontal section.

Fig. 8 is a cross-section on line 8, 8 of Fig. 7.

Fig. 9 is an elevation of a side plate.

Fig. 10 is a cross-section on line 10, 10 of Fig. 9.

Fig. 11 is a plan of a spacer bar on an enlarged scale.

Fig. 12 is a side elevation of same.

Fig. 13 is an end elevation of same.

Fig. 14 is a top plan view of a top or floor plate.

Fig. 15 is a side elevation of same.

Fig. 16 is an end elevation of same.

Fig. 17 is a longitudinal section of the venturi.

Fig. 18 is an end elevation of same at inlet.

Fig. 19 is an end elevation of same at outlet.

Fig. 20 is a cross-section of damper disc.

Figs. 3 and 4 are on a larger scale than Figs. 1 and 2. Figs. 5 and 6 are on a larger scale than Figs. 3 and 4. Figs. 7, 8, 9 and 10 are on a larger scale than Figs.

1 and 2, but on a smaller scale than Figs. 5 and 6.

Figs. 7ª, and 11 to 20 inclusive are on a larger scale than Figs. 7, 8, 8 and 10.

Similar numerals refer to similar parts throughout the several views.

In the application of the invention, as shown by way of example, in Figs. 1 and 2, the furnace is adapted to heat a single shell or still in oil refining processes. The shell 25 is suitably supported above the combustion chamber 26 and forms the roof of said combustion chamber. At the left hand end of the combustion chamber is provided one or more Venturi formations 27, into each of which a burner proper 28 projects. At the other end is provided the flue 29 for discharge of burnt products, usually connected with a stack or chimney. Into this discharge flue 29, or in the path of travel or burnt products from the combustion chamber 26 to the flue 29, is interposed an air preheater 30. This, as shown, comprises a number of assembled heating sections and half sections 31, each section comprising a number of tubes 32 joined at each end to tube plates 33. This heater is located in a chamber or passage 34 between the combustion chamber 26 and the outlet flue 29, and between the air duct 35 and the outside atmosphere. A perforated wall or bridge 36 surmounts the top of the chamber 34, through which the burnt products pass toward the flue 29. An air chamber or passage 37 delivers to the tubes 32 at one side of the chamber or passage 34. The passage of air through the tubes 32 may be regulated in any way as, by valves 38, which will regulate the flow of air through the heater to the air duct or ducts 35 leading to the Venturi formation 27.

It will be obvious that the heater may be so constructed that the combustion gases may pass through the tubes while the air to be heated may pass between the tubes and that the tubes may be arranged in any direction desired. The point is that the air shall pass through a zone heated by the hot gases but shall not mix with the gases. Such a heater is called a closed heater.

In accordance with the present example the preheater 30 comprises a number of sections and half sections 31 securely bolted together to form a complete unit. The tube plates are preferably made with flanges 33' to facilitate bolting together, as at 39. The width and height of each section for example is fifteen inches; the half sections being of the same height but of approximately half the width, or eight inches. Thus it will be seen that a heater can be built up for almost any width of still by a combination of section, or sections and half sections to fill up entirely the available furnace width.

In the present example the heater is shown as built of two sections height or two decks. This arrangement may be varied to suit conditions as to size of furnace and temperature conditions.

In order to maintain velocities of the gases fairly constant, and to compensate for reduction in volume as the gases cool, the tubes in the lower section are spaced closer together. The number of them is also increased to give the added heating surface required to offset the smaller temperature difference and transfer rate per square foot obtained with the cooler gas.

Any suitable by-pass, not shown may be provided with an emergency damper, in order to by-pass the heater when desired to facilitate lighting the fire.

The air ducts 35 extend from the preheater to the burner Venturi blocks 27, and are shown as of square cross-section, for example about fourteen inches wide by about fourteen inches high, and one, two or more may be used per still, depending upon size and capacity of the furnace and the number of burners used. It is preferable to have a separate duct for each burner.

The ducts are preferably constructed entirely of cast iron and steel, thereby forming a rigid construction throughout, but permitting the necessary free expansion of the metal due to changes in temperature. These air ducts are all of the same construction, so that a description of one will suffice for all.

Referring to Figs. 7 to 16, the air duct 35 is constructed of side plates, top plates and upper and lower spacers. The lower spacers or cross-bars 41 may be laid in the concrete floor transverse the line of the duct and properly spaced, relatively to the length of a side plate 42. The side plates are provided with right angled flanges as at 43 at the top and bottom and at one end, the other end 44 is tapered to pass between the upper and lower spacers and past the flanged end of the adjacent side plate, so as to have a sliding overlap. The lower abutting flanges of adjacent side plates meet or nearly meet on the spacer. The inner wall of the side plate engages the lug 45 on the spacer, while a clamping bolt 46, projecting through the recess 47 in the end of the spacer 41, and between the abutting ends of the flanges of the side plates, serves to maintain said side plates in position against the lug 45. The construction and arrangement of the upper spacers 51 are substantially the same, except that these spacers rest upon the abutting top flanges of adjacent side plates, which are clamped in the same way against similar lugs 50. This is the construction between all adjacent side plates on both sides of the duct, in order to maintain the side plates in required position with respect to each other and the spacers, without the necessity of bolt or rivet holes in the said side plates. The construction secures the required rigidity while permitting relative longitudinal movement between adjacent side plates due to expansion and contraction.

The roof of the duct comprises cast iron plates 48 provided with the downwardly projecting fins 49 running parallel with the longitudinal axis of the duct. These plates 48 are also provided with lugs 50 for engaging the upper walls of the side plates. These plates rest loosely upon the flanged tops of the side plates between the upper spacers 51. Upon the roof or top plates of the duct and the upper spacers is usually laid a single course of fire-brick 53 which forms the floor of the combustion chamber.

The space between the several ducts may be filled with concrete or similar material.

These air ducts 35 deliver preheated air from the heater 30 to the several Venturi formations 27 in which are properly positioned the fuel burners 28.

The venturi 27 for the burner is preferably formed of special heavy shapes of super refractory material. The entrance portion or block 56 is designed to give the correct angle of convergence to induce the maximum quantity of combustion air. The proper angle of convergence of the throat has been found to be approximately twenty-eight degrees, which is such as to give a very high inducing action upon the air. The delivery end or muffle 57 is similarly built of heavy shapes of said super-refractory material and has a diverging angle of approximately eight degrees, which will also assist in giving a high inducing action and facilitate its working almost independently of the furnace draft created by the smoke stack.

The Venturi formation is built of special heavy shapes of super-refractory material, in order to withstand extremely high temperatures and the eroding action of the high velocity gases.

The lower margin of the discharge mouth of the muffle 57 is in the plane of the furnace or combustion chamber floor. The combustion chamber extends horizontally and unobstructed from one end of the still or shell 25 to the other; the burner is at one extreme end and the outlet for burnt products at the other end. The combustion chamber is relatively long, that is, in the example shown, about six times its cross-sectional dimension, and the under wall of the still or shell forms the top wall of the combustion chamber, while the side walls of the chamber flare upwardly.

In operation most of the flame from the venturi will extend into the furnace in a horizontal path of travel for a considerable distance, before turning up, and does not impinge against the still bottom. The advantage of this method of oil firing is that it permits of the highest transfer of heat by flame radiation. It is therefore apparent that since radiant heat is propagated with equal intensity in all directions, it is impossible to cause a concentration or localized overheating of small portions of the still with its attendant bad effect on the shell material and product being heated.

The burners 28 are centered and supported in a cast iron furnace front equipped with an adjustable disc regulating damper 59. In accordance with this arrangement it is impossible to light the burner before first opening the damper to admit air whereby the danger from explosion from this source is eliminated and the proper air supply to the individual burners is under the control of the fireman at all times.

The burner projects into the Venturi entrance block. As the degree of induction varies with the oil and atomizing steam pressures, the burners are adjustably mounted, by means of the telescopic bracket 60, Fig. 1, in order to change the distance the burner extends into the venturi to secure the desired inducing effect. For the purpose of this adjustment, the section 61 of the steam line, and the section 62 of the oil line are made flexible.

The venturi, with the special form of inlet throat for air induction, and with the elongated slightly flaring discharge throat or muffle, is capable of inducing the necessary air for combustion irrespective of the stack draft. This because the atomizing of the fuel oil is taking place under the pressure created by an atomizing agent, by virtue of the fact that this pressure is suddenly released causing a high velocity jet to pass through the center of the venturi. By virtue of the kinetic effect of this jet and the shape of the Venturi muffle, a maximum quantity of air may be induced. In addition to this, the shape of the muffle is such that the velocity of the jet is gradually reduced because of the increasing cross-sectional area of the muffle. At a certain point in the muffle the velocity of the jet practically balances the speed of the flame propagation, and ignition takes place.

As the intake throat of the Venturi block 56 is designed for induction of the maximum quantity of combustion air, and as the mean velocity of fuel and atomizing medium may be regulated as desired, the amount of induced combustion air must be correspondingly controlled.

For instance, if 100 or 200% excess air were admitted to the muffle 57, especially near its upper capacity limits, the velocities would be so high through the muffle that they would exceed the speed of the flame propagation, and ignition would take place somewhere outside of the muffle.

The control of induced combustion air is secured by the proper adjustment of the burner in the venturi, and of the damper disc 59, to the positions where good combustion is taking place, and taking place inside the muffle itself. The muffle is adapted to take care of a considerable range in velocity of fuel and atomizing medium, with corresponding control of induced air.

While steam has been referred to as a suitable fuel atomizing agent, it will be understood that other atomizing agents, such as air or gas under pressure, may be used. The pressure of the atomizing medium will also be a factor in the air induction and flame projection.

What I claim is:—

1. In a furnace, the combination of means forming a combustion chamber, a flue at one end thereof for discharge of the products of combustion, a fuel burner discharging into the combustion chamber at the other end thereof, an air duct delivering to the burner, the top and side walls of said duct formed of sheet metal sections, and transverse spacers, means for securing said elements in required position but adapted to permit relative movement between the elements, and a heater in the path of travel of burnt products for heating the air passing into the air duct.

2. In a furnace, the combination of means forming an elongated horizontally extending combustion chamber, a Venturi formation at one end thereof and an exit for burnt products at the other end, a fuel burner positioned within the venturi, means connecting the burner with a fuel supply and with an atomizing medium, a damper moving on the axis of the venturi for controlling the delivery of air thereto, the venturi having a slightly flaring, elongated discharge muffle so proportioned with respect to the velocity of the fuel and atomizing medium and the control of the induced air, that combustion will take place within the muffle and the flame will be projected horizontally into the combustion chamber.

3. In a furnace, the combination of means forming an elongated, horizontally extending combustion chamber, a Venturi formation at one end thereof and an exit for burnt products at the other end, a fuel burner positioned within the venturi, means connecting the burner with a fuel supply and with an atomizing medium, a damper movable toward and away from the entrance mouth of the venturi for controlling the delivery of air thereto, the venturi having a slightly flaring elongated discharge muffle so proportioned with respect to the velocity of the fuel and atomizing medium and the control of the induced air, that combustion will take place within the muffle and the flame will be projected horizontally into the combustion chamber.

4. In a furnace, the combination of means forming an elongated horizontally extending combustion chamber, a Venturi formation at one extreme end thereof and an exit for burnt products at the other end, a fuel burner positioned within the venturi, means connecting the burner with a fuel supply and with an atomizing medium, the venturi having a slightly flaring elongated discharge end, the lower margin thereof being in the plane of the floor of the combustion chamber, and adapted to project the flame horizontally a substantial distance into the combustion chamber.

5. In a furnace, the combination of means forming an elongated horizontally extending combustion chamber, a Venturi formation at one end thereof and an exit for burnt products at the other end, a fuel burner positioned within the venturi, means connecting the burner with a fuel supply and with an atomizing medium, the venturi having a slightly flaring elongated discharge end adapted to project the flame horizontally a substantial distance into the combustion chamber, and an air duct passing beneath the combustion chamber and separated therefrom by metal plates forming part of the floor of said chamber, said air duct delivering to the venturi.

6. In a furnace, the combination of means forming an elongated horizontally extending combustion chamber, having its side walls flaring upwardly, a Venturi formation at one end of the combustion chamber and an exit for burnt products at the other end, a fuel burner positioned within the venturi, means connecting the burner with a fuel supply and with an atomizing medium, the venturi having a slightly flaring elongated discharge end adapted to project the flame horizontally a substantial distance into the combustion chamber so as to utilize the radiant heat for even distribution of the temperature.

7. In a furnace, the combination of means forming a combustion chamber, a fuel burner positioned at one end thereof and an exit for burnt products at the other end, and means forming an air passage beneath the floor of the combustion chamber and delivering to the fuel burner, said means including metal top and side plates, the side plates each provided with right angle flanges at the top and bottom and at one end thereof, the other end being tapered to slide past the flanged end of an adjacent side plate.

8. In a furnace, the combination of means forming a combustion chamber, a fuel burner positioned at one end thereof and an exit for burnt products at the other end, and means forming an air passage beneath the floor of the combustion chamber and delivering to the fuel burner, said means including metal top and side plates, the side plates each provided with right angle flanges at the top and bottom and at one end thereof, the other end being tapered to slide past the flanged end of an adjacent side plate and cross-bar spacers associated therewith.

9. In a furnace, the combination of means forming a combustion chamber, a Venturi formation at one end thereof and an exit for burnt products at the other end, a fuel burner positioned within the venturi, means for delivering preheated air to the venturi including an air preheater comprising a plurality of separable sections, each section composed of parallel tubes with flanged tube plates connected to the ends thereof, the flanges of the several sections being disengageably secured together.

10. In a furnace, the combination of means forming an elongated horizontally extending combustion chamber having sides thereof flaring upwardly, an apertured formation of refractory material at one end of the combustion chamber and an exit for burnt products at the other end, a fuel burner projecting into the apertured formation, means connecting the burner with a fuel supply and with an atomizing medium, the apertured formation having a slightly flaring elongated discharge end adapted to project the flame horizontally a substantial distance into the combustion chamber so as to utilize the radiant heat for even distribution of the temperature.

11. In a furnace, the combination of means forming an elongated horizontally extending combustion chamber, an apertured formation of refractory material at one end of the combustion chamber and an exit for burnt products at the other end, a fuel burner projecting into the apertured formation, means connecting the burner with a fuel supply and with an atomizing medium, the apertured formation having a slightly flaring elongated discharge end extending into the combustion chamber beyond the front wall thereof and adapted to project the flame horizontally a substantial distance into the combustion chamber so as to utilize the radiant heat for even distribution of the temperature.

WILLIAM FERGUSON.